(12) United States Patent
Tomlinson

(10) Patent No.: US 7,628,216 B2
(45) Date of Patent: Dec. 8, 2009

(54) EQUINE HOOF RASP

(76) Inventor: William J. Tomlinson, 1161 Broadhead School Rd., Greenville, VA (US) 24440

( * ) Notice: Subject to any disclaimer, the term of this patent is extended or adjusted under 35 U.S.C. 154(b) by 0 days.

(21) Appl. No.: 12/285,560

(22) Filed: Oct. 8, 2008

(65) Prior Publication Data
US 2009/0090519 A1    Apr. 9, 2009

Related U.S. Application Data

(60) Provisional application No. 60/960,642, filed on Oct. 9, 2007.

(51) Int. Cl.
*A01L 11/00* (2006.01)
*A01K 13/00* (2006.01)
(52) U.S. Cl. .............. 168/48.1; 119/631; 119/633
(58) Field of Classification Search .............. None
See application file for complete search history.

(56) References Cited

U.S. PATENT DOCUMENTS

| | | | | |
|---|---|---|---|---|
| 193,209 A * | 7/1877 | Atkins | ............ | 76/36 |
| 1,345,472 A * | 7/1920 | Anheuser | ............ | 407/29.15 |
| 1,785,836 A * | 12/1930 | Lehto | ............ | 407/29.14 |
| 2,258,536 A * | 10/1941 | Burnell | ............ | 407/29.15 |
| 3,501,821 A * | 3/1970 | Ford | ............ | 407/29.15 |
| 4,179,779 A * | 12/1979 | Hayes | ............ | 409/345 |
| RE30,794 E * | 11/1981 | Hayes | ............ | 407/29.15 |
| 5,533,894 A * | 7/1996 | Capps | ............ | 433/1 |
| 5,823,719 A | 10/1998 | Tyler | | |
| 6,939,089 B1 * | 9/2005 | Wickman | ............ | 407/29.15 |
| 6,957,934 B2 * | 10/2005 | Masterson et al. | ....... | 407/29.15 |
| 7,150,589 B2 | 12/2006 | Nordlin | | |
| 7,182,554 B1 * | 2/2007 | Morris | ............ | 407/29.1 |
| 2008/0003066 A1 | 1/2008 | Haugaard | | |

* cited by examiner

*Primary Examiner*—Son T. Nguyen
(74) *Attorney, Agent, or Firm*—Richard C. Litman

(57) ABSTRACT

The equine hoof rasp is used by a horse owner to keep healthy, balanced hooves between the five to eight week intervals before a farrier visit. The equine hoof rasp has an elongated peanut-shaped handle with a front end and a rear end. The rear end is larger than the front end. The handle has a V-shaped cutout extending from the rear end to the front end. The V-shaped cutout forms a concave middle for mounting a pair of rasps at an angle. To hold the rasps, there is a pair of congruent retaining shields. The shields form an open rectangular middle section. The open rectangular middle section frames the rasps when the rasps are mounted in the peanut-shaped handle.

4 Claims, 8 Drawing Sheets

EQUINE HOOF RASP

CROSS-REFERENCE TO RELATED APPLICATION

This application claims the benefit of U.S. Provisional Patent Application Ser. No. 60/960,642, filed Oct. 9, 2007.

BACKGROUND OF THE INVENTION

1. Field of the Invention

The present invention relates to equipment for grooming or maintaining horses, and particularly to an equine hoof rasp for maintaining the hooves of a horse between farrier visits.

2. Description of the Related Art

In the United States and throughout the world, thousands of people keep horses and use horses for a variety of purposes including riding, showing, and as draft animals. Horses, of course, have hooves and the hooves must be maintained to prevent damage to the hooves, such as splitting, and possibly to the horse as well. In most cases, to protect the hooves, the horse is shod. A person who cares for the hooves and shoes the horse with horseshoes is most often referred to as a farrier.

The hooves grow and one of the most important aspects of hoof maintenance and preparation for shoeing is to keep the hooves trimmed. Trimming the hoof can be a difficult task, especially for the non-farrier. Horse hooves are very tough and it is physically difficult to cut through the material. However, sharp edges on the hooves must be rounded to prevent cracking. Additionally, rounding flares put undue stress on the entire hoof capsule, so these should be removed as soon as possible. Removing flares and edges when they begin will usually stop undue stress on the hoof capsule, joints and tendons of the horse. It will also stop cracking and maintain balanced, symmetrical hooves. Healthy, balanced hooves are usually created, and are seldom inherited. However, typical farrier visits at five to eight week intervals usually cannot achieve optimum performance alone.

Currently, farrier tools for maintaining equine hoofs involve simple filing tools that require holding a horse's foot in the farrier's lap when attending to each hoof. But, horses are large animals, and it is often difficult for the non-farrier person to control the animal during the trimming maintenance. Additionally, farrier tools are not conducive for an average non-farrier person to attempt basic hoof maintenance, due to the nature of the tool. It is well known that ease of use contributes to how often maintenance is performed and by whom.

Thus, an equine hoof rasp solving the aforementioned problems is desired.

SUMMARY OF THE INVENTION

The equine hoof rasp has a peanut-shaped handle with a front end and a rear end. The rear end is larger than the front end. The handle has a V-shaped cutout extending from the rear end to the front end. The V-shaped cutout forms a concave middle for mounting at least one rasp from the rear end to the front end. At least one retaining shield holds the at least one rasp. The shield has an open rectangular middle section and an outer perimeter that aligns with the peanut-shaped handle from the rear end to the front end. The open rectangular middle section frames the at least one rasp when the rasp is mounted in the peanut-shaped handle. The handle may also have a pair of fingerholds that are positioned between the front end and the rear end of the peanut-shaped handle. The fingerholds are for holding the equine hoof rasp.

The at least one retaining shield includes a pair of congruent retaining shields. The congruent retaining shields are C-shaped and have an outer perimeter aligned with the peanut-shaped handle, and an inner perimeter with straight edges forming the open rectangular middle section. Each retaining shield has pairs of end tabs affixed thereto. Each of the end tabs has a rectangular hinge connector with an aperture. The hinge connector is for mounting the retaining shields to the peanut-shaped handle. The retaining shields have an outer perimeter and a plurality of equally spaced male protrusions positioned along the perimeter. These protrusions mate with female holes equally spaced in the V-shaped cutout of the peanut-shaped handle.

The peanut-shaped handle includes a plurality of spaced V-topped supports to hold the at least one rasp in position. The supports are affixed and spaced in the concavity of the peanut-shaped handle, and the V-topped supports have curved bottoms to align with the peanut-shaped handle. The rasp lies on the V-topped supports. A plurality of grasping protrusions are formed on the plurality of V-topped supports to keep the at least one rasp on the V-topped supports. The protrusions grasp and hold the at least one rasp to the plurality of V-topped supports affixed to the peanut-shaped handle.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
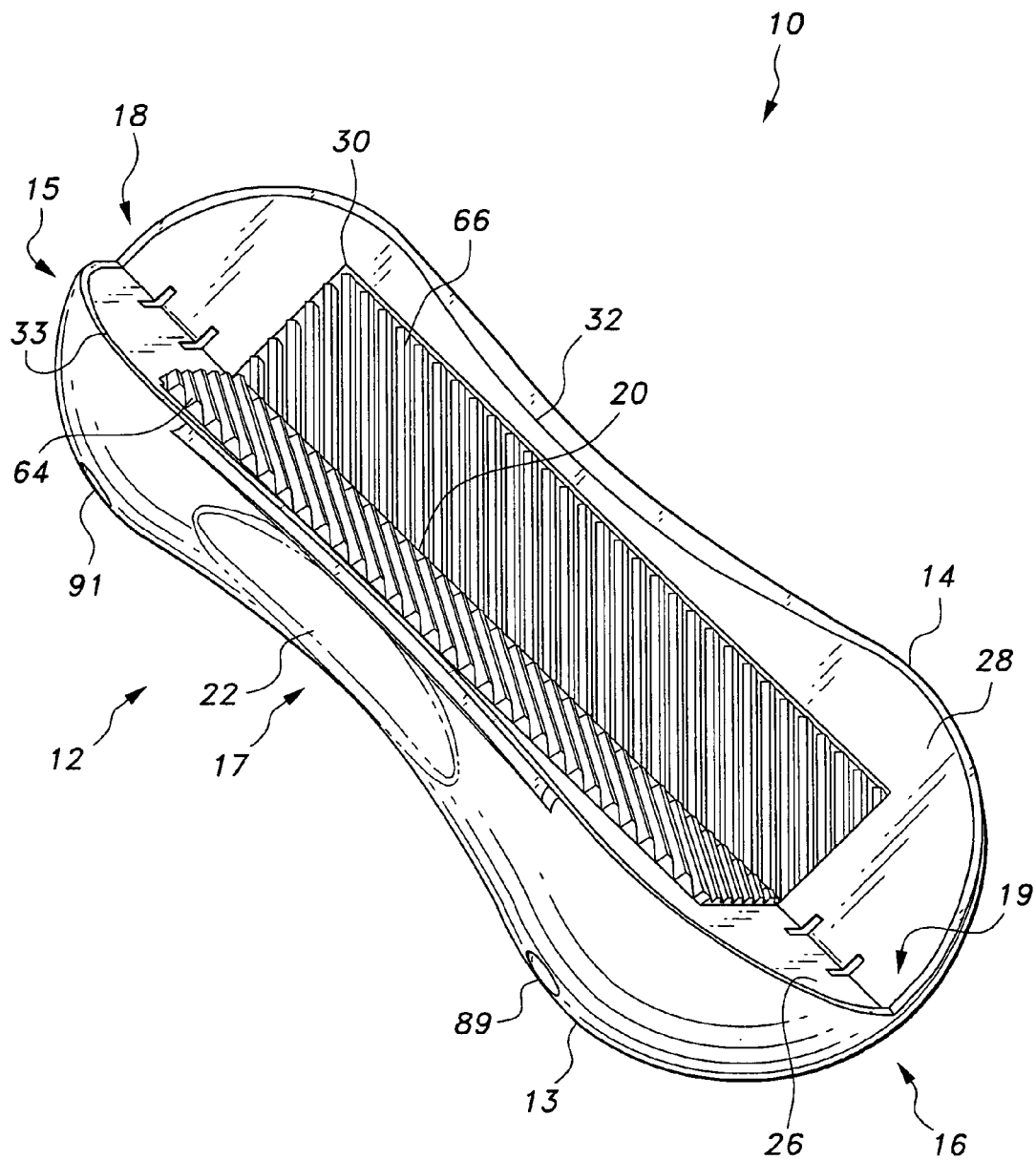
FIG. 1 is a perspective view of an equine hoof rasp according to the present invention.
Figure 2:
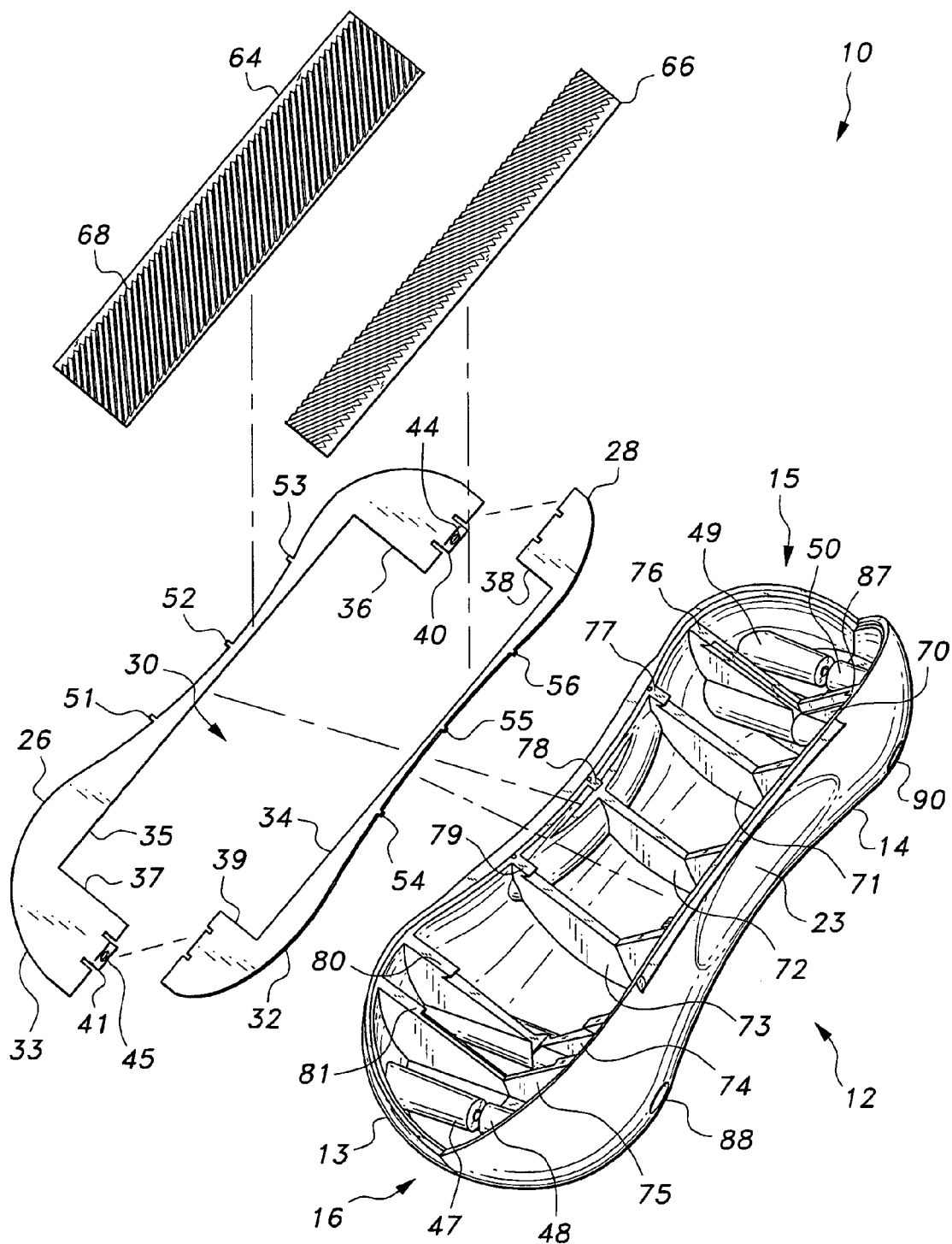
FIG. 2 is an exploded view of the equine hoof rasp according to the present invention.
Figure 3:
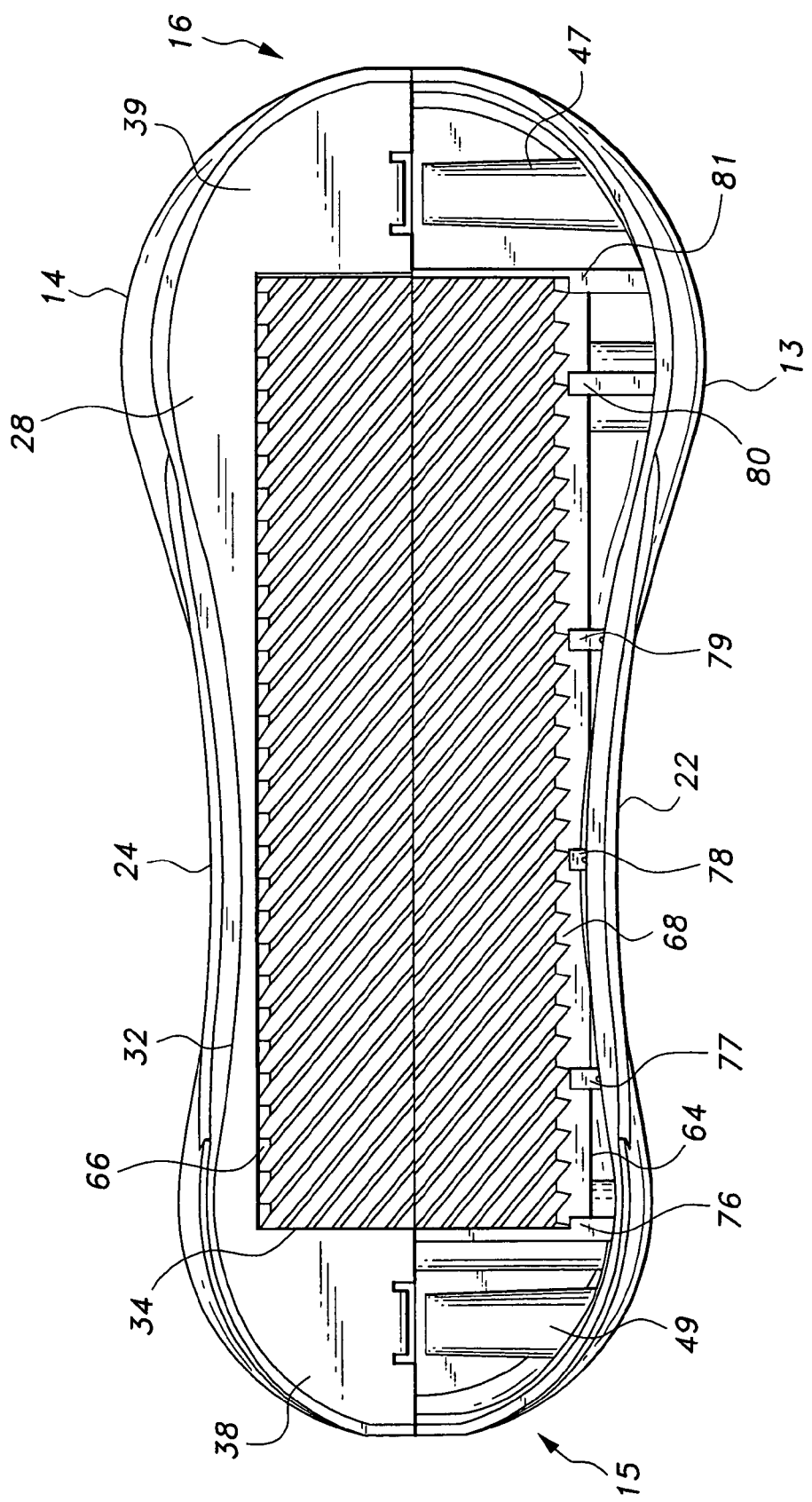
FIG. 3 is a partial top view of the equine hoof rasp according to the present invention, one of the retaining shields being removed.
Figure 4:
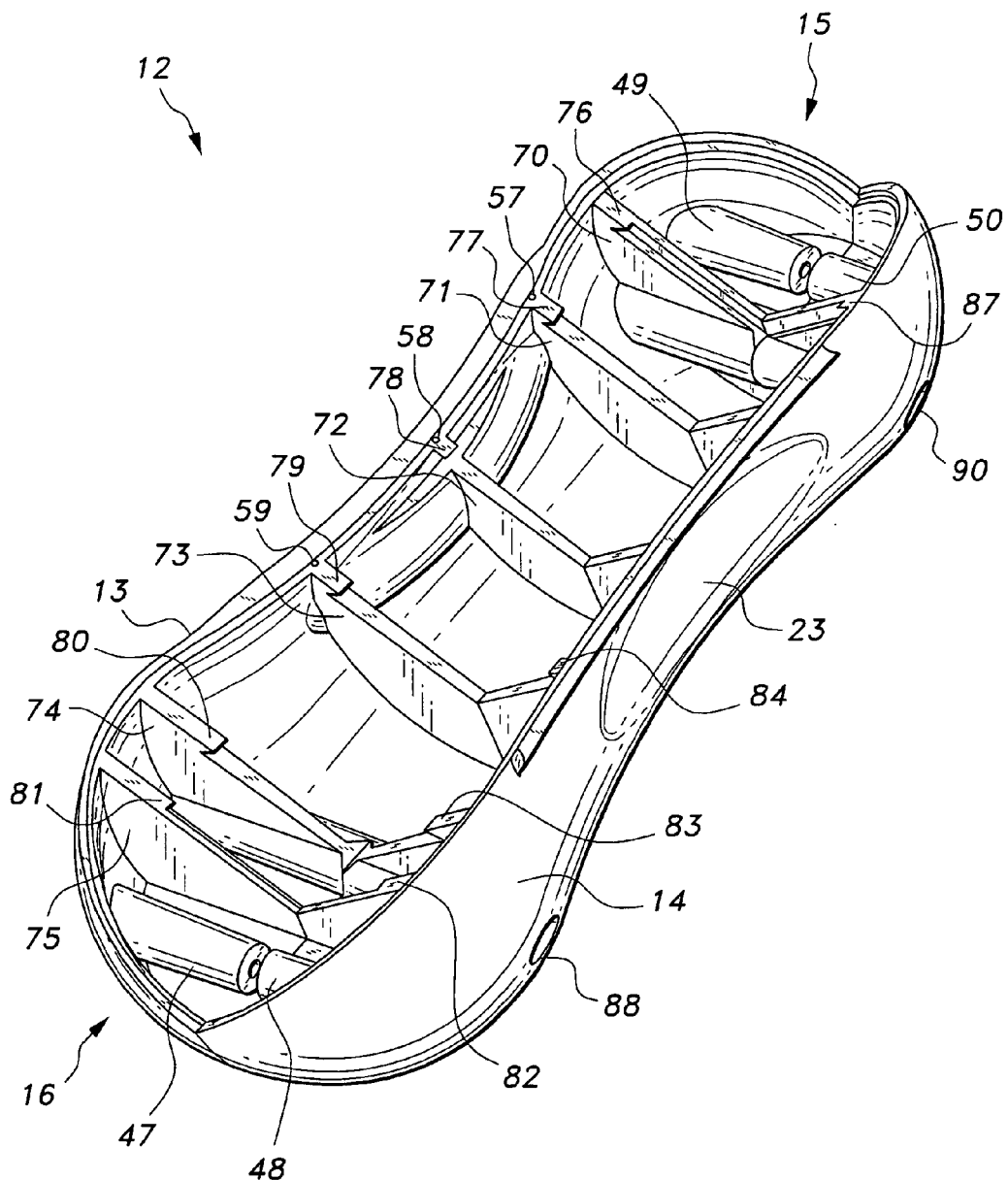
FIG. 4 is a perspective view of the peanut-shaped handle for the equine hoof rasp according to the present invention.
Figure 5:
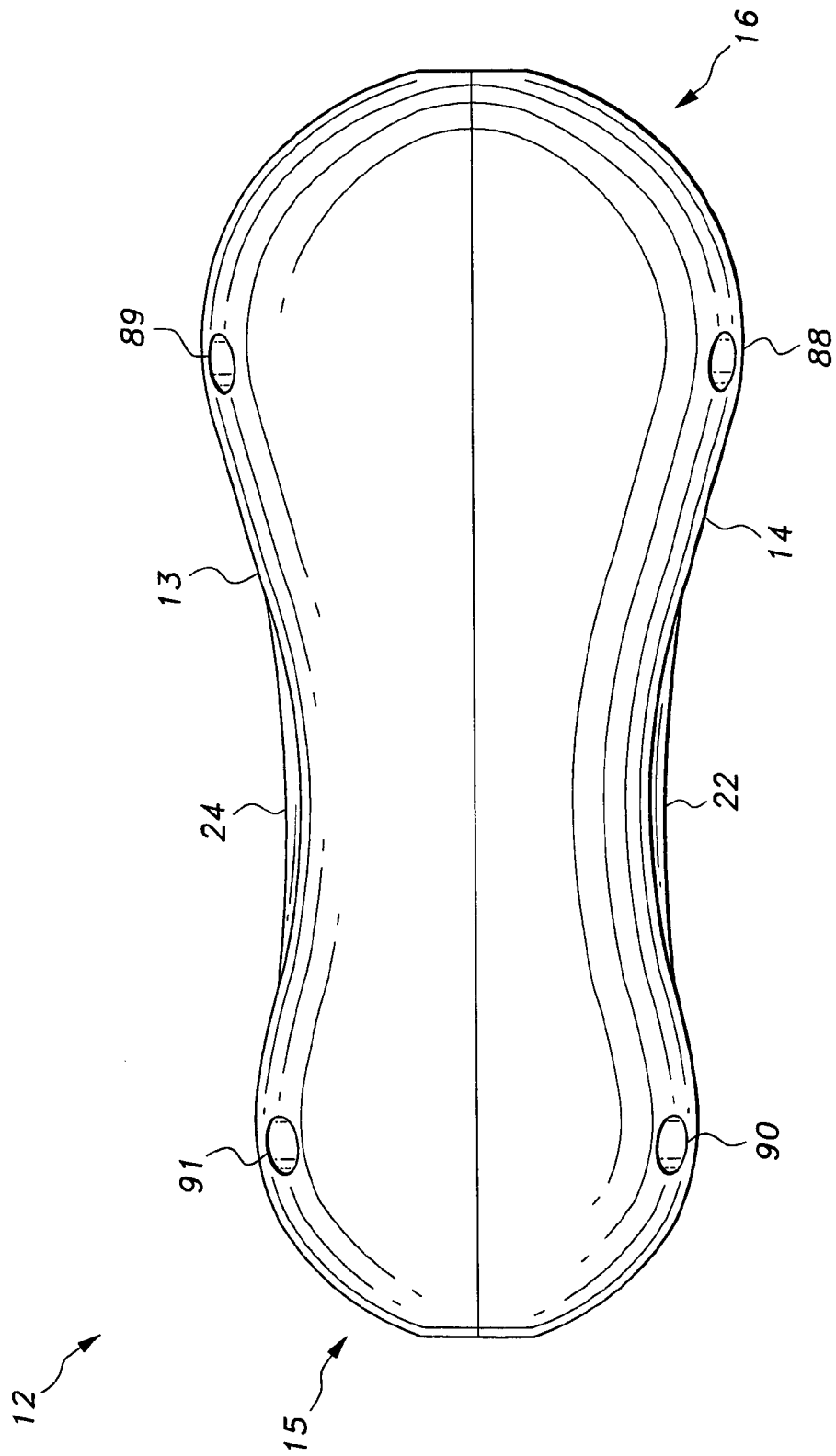
FIG. 5 is a bottom view of the peanut-shaped handle for the equine hoof rasp according to the present invention.
Figure 6:
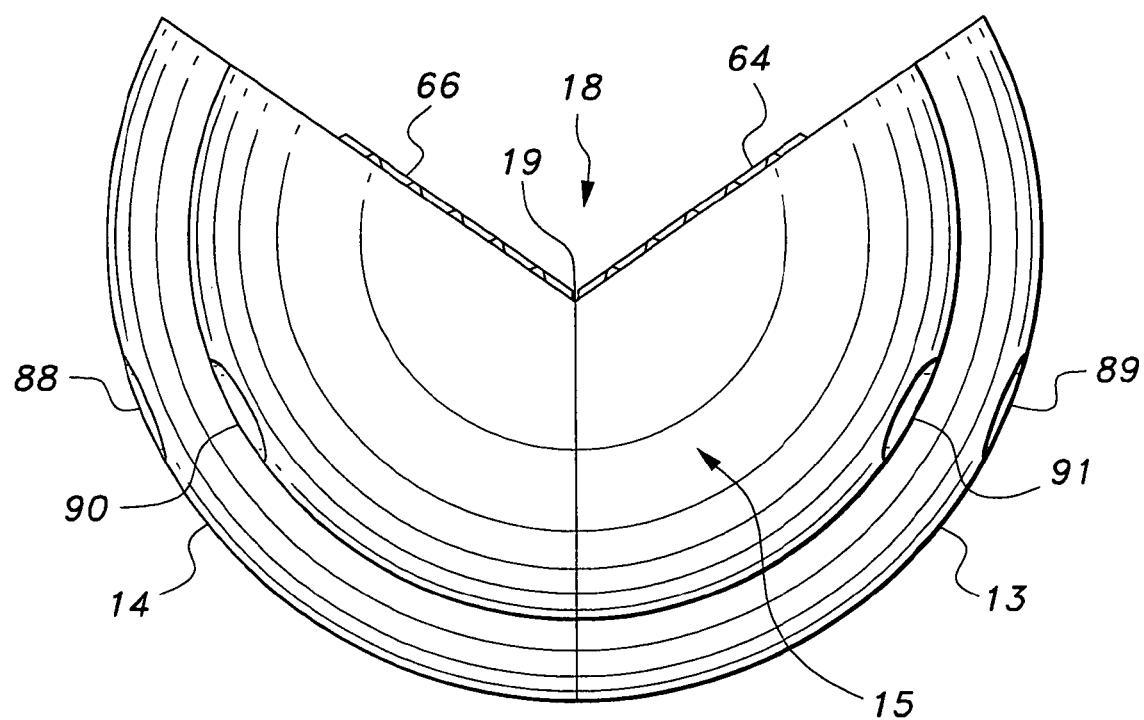
FIG. 6 is a front view of the peanut-shaped handle for the equine hoof rasp according to the present invention.
Figure 7:
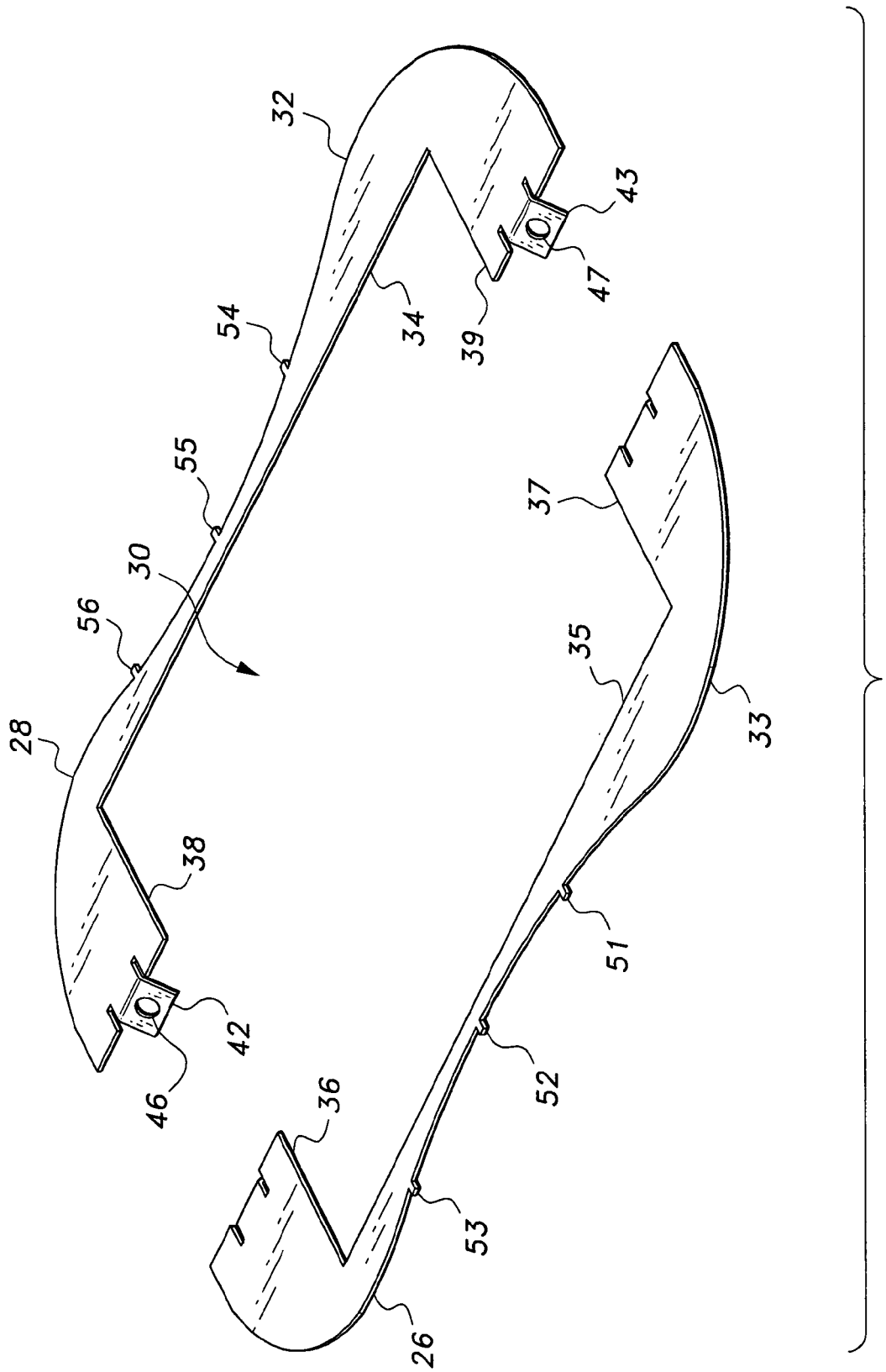
FIG. 7 is a perspective view of a pair of retaining shields for the equine hoof rasp according to the present invention.
Figure 8:
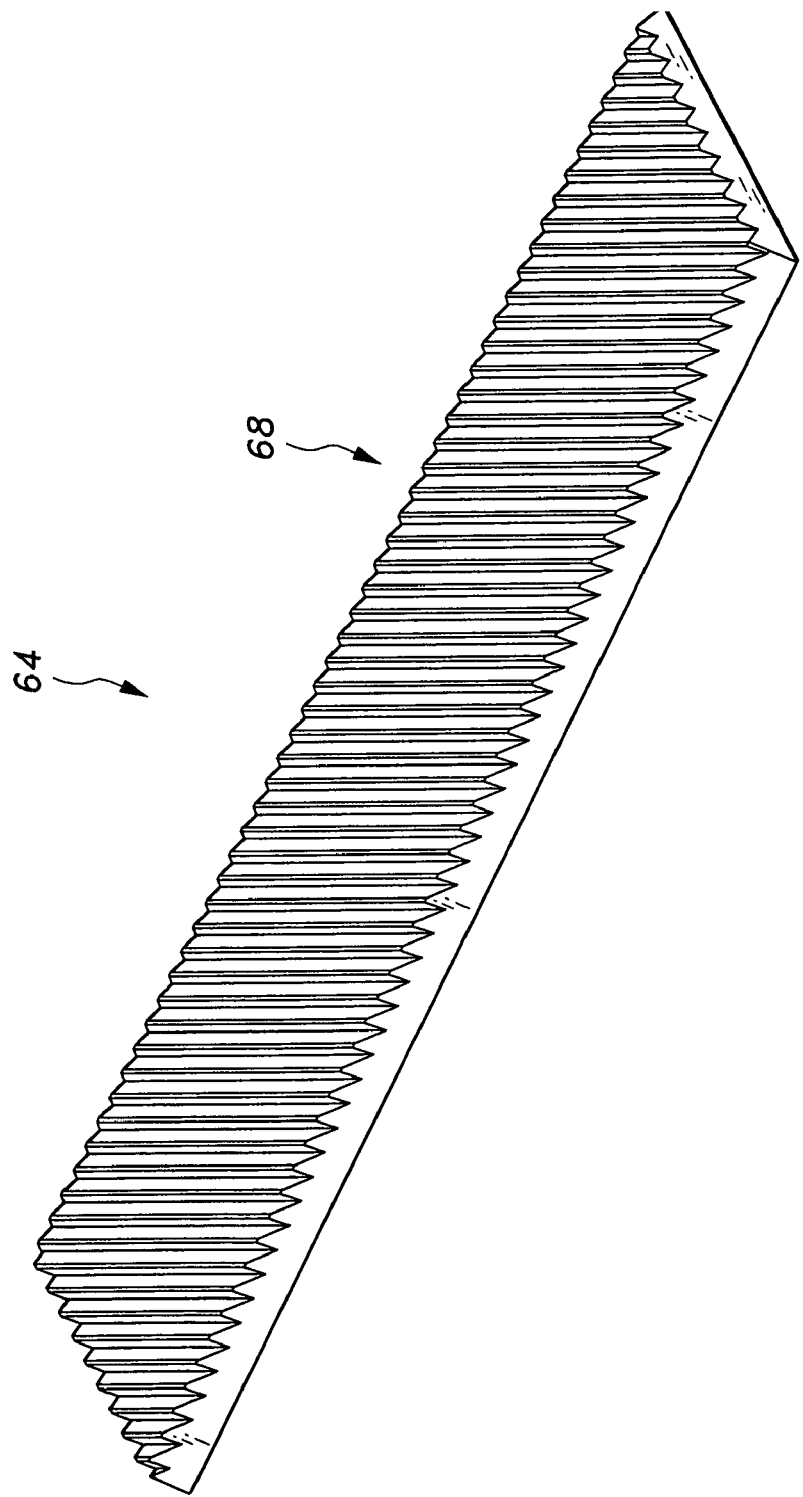
FIG. 8 is a perspective view of one of the rasps for the equine hoof rasp according to the present invention.

With reference to FIGS. 1-8, the equine foot rasp is generally designated as 10 in the drawings. The equine hoof rasp 10 has an elongated, peanut-shaped handle 12. The elongated, peanut-shaped handle 12 performs a number of functions. The handle 12 securely holds other parts of the equine hoof rasp 10 and is sufficiently strong to support pressure from an external force such as a hand of a person using the equine hoof rasp 10. The handle 12 is made as two congruent parts 13, 14 that are mirror images of each other, both on the outside and in the inside, as will be discussed hereinafter.

The peanut-shaped handle 12 includes a semi-round, bulb-shaped front end 15 and a semi-round, bulb-shaped rear end 16 with the rear end 16 being larger than the front end 15. Both the front end 15 and the rear end 16 tapering to a smaller or thinner, semi-round center area 17. The rear end 16 formed to receive or support a palm of the person using the equine hoof rasp 10. The front end 15 formed to be comfortable for the person using the equine hoof rasp 10. Thus, the peanut-shaped handle 12 fits comfortably in the hand of the person using the equine hoof rasp 10, regardless if the person is male or female.

The peanut-shaped handle 12 has a V-shaped cutout 18 with a vertex 19 forming and angle of approximately one hundred and ten degrees. The V-shaped cutout 18 extends from the rear end 16 to the front end 15 along a center axis 20. Near the round center area 17 and extending parallel to the vertex 19 are a pair of fingerholds 22, 24. The fingerholds 22, 24 being positioned in the round center area 17 so that the person using the equine hoof rasp 10 can position a thumb in one and a couple of fingers in the other to apply added pressure when rasping the hoof. Thus, the fingerholds 22, 24 provide additional support for holding the equine hoof rasp 10 during use.

The equine hoof rasp 10 also includes a pair of retaining shields 26, 28, which are two congruent components. Each of the retaining shields 26, 28, when separated, is nearly C-shaped. Although, the retaining shields 26, 28 are shown and described as two congruent components, it is possible that the shields 26, 28 can be made as just one complete piece or shield. The retaining shields 26, 28 are made of a heavy material, such as Galvalume 24-Ga. or 300 series stainless steel 22-Ga. The retaining shields 26, 28 have an open rectangular middle section 30 when the shields 26, 28 are mated together and mounted to the peanut-shaped handle 12.

Each of the retaining shields 26, 28 has an outer perimeter 32, 33 that matches the contours of the peanut-shaped handle 12 from the front end 15 to the rear end 16 and then from the rear end 16 to the front end 15. The outer perimeters 32, 33 have curved shapes and the inner perimeters 34, of each shield 26, 28 have straight edge shapes to form the rectangular middle section 30. Part of the straight edged inner perimeters 34, 35 include end tabs 36, 37, 38, 39 at each end of the respective retaining shield 26, 28.

On each of the end tabs 36, 37, 38, 39 is a rectangular hinge connector 40, 41, 42, 43 with an aperture 44, 45, 46, 47 through each of the hinge connector 40, 41, 42, 43. For mounting each of the retaining shields 26, 28 to the handle 12, each of the apertures 44-47 axially aligns with an hollow elongated cylinder 47, 48, 49, 50 positioned on either side of the fingerholds 22, 23 in the concave center of the handle 12 and extend perpendicularly to the vertex 19. When mounted, the retaining shields 26, 28 are capable of being opened and closed like a door because of the hinges 40-43. When closing the retaining shields 26, 28, a locking means is provide by the formation of a number of equally spaced male protrusions 51, 52, 53, and 54, 55, 56 along the outer perimeters 32, 33 of the congruent retaining shields 26, 28 and a plurality of equally spaced female holes 57, 58, 59, and 60, 61, 62 in the V-shaped cutout 18 of the handle 12.

The last main part includes two identical rasps 64, 66. The rasps 64 are shown with a rectangular shape. However, it is possible to have one rasp and that rasp being curved. Additionally, it should be noted that a file differs from a rasp in having furrows made by straight cuts of a chisel, either single or crossed, while the rasp, such as 64, 66, has coarse, single teeth, generally indicated by the number 68, raised by a pyramidal end of a triangular punch. The rasps 64, 66 may be formed either in a V-shape, in a curved shape, or a concave shape. The rasps 64, 66 may have different size teeth for different filing needs. The rasps 64, 66 are typically made of steel, but other metals may be used, perhaps even hard composites. A surface of the rasps 64, 66 may also be adapted to receive other shaping or maintenance materials such as for polishing.

The rasps 64, 66 are laid onto the handle 12 and held in place with V-topped supports 70, 71, 72, 73, 75 affixed and spaced perpendicular across the center axis 20 of the handle 12. The bottoms of these V-topped supports 70-75 being curved to follow the contour of the peanut-shaped handle 12. Additionally, each of the V-topped supports 70-75 has grasping protrusions 76, 77, 78, 79, 80, 81, and 82, 83, 84, 85, 86, 87 to receive and hold the respective rasps 64, 66. Thereafter, the retaining shields 26, 28 are closed over the rasps 64, 66 with the rasps 64, 66 protruding through the open rectangular middle section 30.

A plurality of fastening members 88, 89, 90, 91 securely connect the two congruent parts 13, 14 together and form the peanut-shaped handle 12.

It is to be understood that the present invention is not limited to the embodiment described above, but encompasses any and all embodiments within the scope of the following claims.

I claim:

1. An equine hoof rasp, comprising:
    at least one rasp;
    an elongated handle having a front end and a rear end, the rear end being larger than the front end, the handle having a cutout extending from the rear end to the front end, the cutout forming a concave middle for mounting the at least one rasp to the handle; and
    at least one retaining shield having an open middle section and an outer perimeter aligned with the elongated handle, the open middle section framing the at least one rasp mounted in the elongated handle; wherein the at least one retaining shield comprises a pair of congruent retaining shields having: an inner perimeter with edges forming the open middle section; a pair of end tabs affixed thereto, each of the end tabs having a hinge connector having an aperture defined therein for mounting the retaining shield to the handle; and at least one protrusions disposed along the outer perimeter of the retaining shield.

2. The equine hoof rasp according to claim 1, wherein the elongated handle is peanut-shaped and the cutout is V-shaped.

3. The equine hoof rasp according to claim 2, further comprising a pair of fingerholds disposed between the front end and the rear end of the peanut-shaped handle.

4. The equine hoof rasp according to claim 2, further comprising:
    a plurality of spaced V-topped supports disposed in the concave middle of the peanut-shaped handle, the V-topped supports having curved bottoms for alignment with the peanut-shaped handle; and
    a plurality of grasping protrusions formed on the plurality of V-topped supports for grasping and holding the at least one rasp to the plurality of V-topped supports.

* * * * *